Feb. 10, 1931.  O. HÜBNER  1,792,305
JOURNAL BEARING FOR RAILWAY CAR AXLES
Filed Feb. 1, 1929
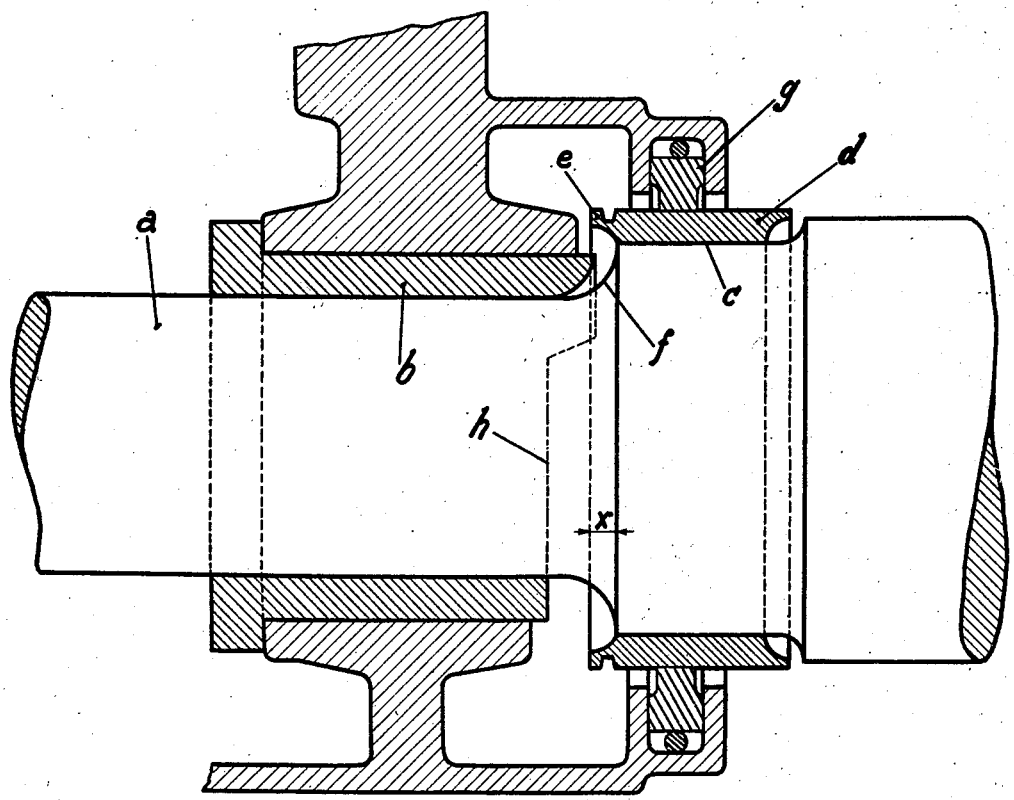
Witnesses:
E. Förster
W. ...
Inventor:
Otto Hübner Patented Feb. 10, 1931

1,792,305

UNITED STATES PATENT OFFICE

OTTO HÜBNER, OF BERLIN-CHARLOTTENBURG, GERMANY, ASSIGNOR TO THE FIRM VEREINIGTE STAHLWERKE AKTIENGESELLSCHAFT, OF DUSSELDORF, GERMANY

JOURNAL BEARING FOR RAILWAY-CAR AXLES

Application filed February 1, 1929, Serial No. 336,721, and in Germany March 19, 1928.

In bearings, especially in journal bearings for railway car axles, the rotation of the journals has sometimes been utilized to scoop oil from an oil sump by means of conveying devices fixed on the journals, and to supply this oil to the bearings. Devices of this type work very satisfactorily but possess the inconvenience that lubricant in excess is supplied to the bearing, which is difficult to return to the oil sump. In bearings of this kind provision must be made for returning the oil into the sump without loss and further for preventing the packing of the axle box at the rear, which is always rather difficult, from being rendered more difficult or even impossible owing to the oil particles moved towards the rear. For this purpose it has been proposed to mount on the emergency journal of the axle centrifugal rings designed to prevent the creeping up of any oil particles. This, however, can not be completely attained for reasons which will be hereinafter explained. It has therefore been necessary to arrange a packing against outflowing oil on the rear side of the axle box, which packing is expensive and is effective only when it is pressed with sufficient pressure against the emergency journal.

The arrangement, hereinafter described obviates the above-mentioned inconveniences, i. e. it prevents the escape of the oil, simplifies the packing on the rear side of the axle box so that it acts merely as a dust-proof packing and prevents at the same time any undesirable loading of the axle journal, seeing that an effective dust-proof packing can be attained without the packing means being pressed heavily against the axle journal or against the emergency journal. The arrangement according to the invention is especially adapted for axle bearings with one-piece bearing bush and it will be hereinafter mainly described in its application to such bearings.

A form of construction of the invention is illustrated by way of example in the only figure of the accompanying drawing in longitudinal section with parts in elevation.

On the journal axle $a$, a one piece bearing bush $b$ is mounted. On the emergency journal $c$ a bush $d$ is mounted which has an annular flange $e$ at the front edge. The oil flowing out of the bearing bush $b$ in rearward direction will travel onto the curved surface $f$, forming the shoulder between the axle journal and the emergency journal, up to the flange $e$ of the oil centrifuge and be thrown off under the centrifugal action. When the axle is at rest, the last oil particles will remain on the ring $e$ in the form of drops or as an oil ring and be distributed over the surface of the bush $d$ as soon as the axle again commences to rotate.

The oil supply to the rear being mostly excessive, the space $x$ will not be sufficient to hold the oil in excess or to positively prevent the oil centrifuge from supplying the oil. It might even be possible, owing to the revolving of the oil centrifuge, for considerable quantities of oil to be held back in this space $x$. On the other hand it is not possible to make the space $x$ of any desired size in view of the utilization of the length of the axle journal or of the supporting bearing surface, so that the above mentioned danger actually exists. This however is the cause of the above-mentioned difficulty in keeping the packing $g$ tight.

According to the invention these inconveniences are absolutely avoided by providing in the rear end of the bearing bush $b$ a cut out portion indicated by the dash line $h$. As experiments have shown, the oil escaping in rearward direction flows along the face $h$ which is arranged so that the oil drips off directly into the oil receptacle. The bearing bush $d$, which tightly encloses the axle journal $b$ at its upper portion, acts in co-operation with the cut out portion $h$ like an oil stripping device and effects a positive guidance of the oil along the face $h$. This obviates the necessity of enlarging the space $x$ which could only be effected by shortening the emergency journal. Further, the supporting surface of the bearing is not shortened by the new arrangement; the rear lower portion of the bearing bush can be cut out without causing any detrimental effect.

What I claim is:

1. In an oil returning device on railway axle bearings with one-piece bearing bushes, a bearing bush having a lower part shorter than the upper part towards the packing side, and an inclined surface at each side of the upper part, near the inner edge thereof.

2. In an oil returning device on railway axle bearings a bush as specified in claim 1 in which the inclined surfaces bear with their inner edge against the axle journal.

In testimony whereof, I have hereunto set my hand.

OTTO HÜBNER.